(12) United States Patent
Hastings

(10) Patent No.: US 7,469,958 B2
(45) Date of Patent: Dec. 30, 2008

(54) MULTIPLE USE VEHICLE ACCESSORY

(76) Inventor: Daniel K. Hastings, 2126 Tigerville Rd., Travelers Rest, SC (US) 29690

( * ) Notice: Subject to any disclaimer, the term of this patent is extended or adjusted under 35 U.S.C. 154(b) by 0 days.

(21) Appl. No.: 11/507,333

(22) Filed: Aug. 21, 2006

(65) Prior Publication Data

US 2008/0042453 A1 Feb. 21, 2008

(51) Int. Cl.
*B60J 11/00* (2006.01)
*B60R 19/52* (2006.01)
(52) U.S. Cl. .............. 296/193.1; 296/95.1; 293/115; 182/21; 14/2.4; 280/79.4
(58) Field of Classification Search .............. 293/115; 296/95.1, 193.1; 182/21; 14/2.4; 280/79.4
See application file for complete search history.

(56) References Cited

U.S. PATENT DOCUMENTS

| | | | | |
|---|---|---|---|---|
| 2,699,964 | A | * | 1/1955 | Hartung ................. 293/115 |
| 4,009,762 | A | * | 3/1977 | Bjerkgard ................ 182/20 |
| D248,229 | S | | 6/1978 | Baker |
| 4,099,760 | A | | 7/1978 | Mascotte et al. |
| 4,950,010 | A | | 8/1990 | Denny |
| 5,104,015 | A | | 4/1992 | Johnson |
| 5,224,636 | A | | 7/1993 | Bounds |
| 5,277,465 | A | | 1/1994 | Weir |
| 5,326,142 | A | | 7/1994 | Dodds et al. |
| 5,364,142 | A | | 11/1994 | Coiner |
| 5,636,885 | A | | 6/1997 | Hummel |
| 5,683,128 | A | * | 11/1997 | Heyns ................. 293/115 |
| 5,836,398 | A | | 11/1998 | White |
| D410,879 | S | | 6/1999 | Orth, Sr. |
| 5,941,329 | A | | 8/1999 | Ichioka et al. |
| 6,039,228 | A | | 3/2000 | Stein et al. |
| 6,152,504 | A | | 11/2000 | Dickson et al. |
| 6,231,093 | B1 | | 5/2001 | Storer |
| 6,290,271 | B1 | | 9/2001 | Geisler |
| 6,318,773 | B2 | | 11/2001 | Storer |
| 6,357,707 | B1 | | 3/2002 | Lindsay |
| 6,398,276 | B1 | | 6/2002 | Smith |
| 6,447,032 | B1 | | 9/2002 | Howell, Sr. |
| 6,612,595 | B1 | | 9/2003 | Storer |
| 6,682,111 | B1 | * | 1/2004 | Houseman et al. .......... 293/115 |
| 6,685,245 | B1 | * | 2/2004 | Houseman et al. .......... 293/115 |
| 6,798,343 | B2 | | 9/2004 | Carrier et al. |
| 6,837,534 | B2 | | 1/2005 | O'Connell |
| 6,932,413 | B2 | | 8/2005 | Lloyd |
| 6,973,996 | B2 | * | 12/2005 | Huff .................... 182/127 |

(Continued)

OTHER PUBLICATIONS

International Searching Authority; PCT International Search Report and Written Opinion; mailed Jan. 25, 2008; copy enclosed (6 pages).

*Primary Examiner*—H Gutman
*Assistant Examiner*—Melissa A Black
(74) *Attorney, Agent, or Firm*—J. Bennett Mullinax, LLC

(57) ABSTRACT

A multiple use vehicle accessory is provided. The accessory includes a first a first member and second member that are longer in the longitudinal direction than in the lateral direction. An end support is attached to both an end of the first member and to an end of the second member. The end support extends at an angle to the longitudinal direction. A cross member extends in the lateral direction and spans the distance between opposite sides of the second member.

9 Claims, 11 Drawing Sheets

U.S. PATENT DOCUMENTS

| | | |
|---|---|---|
| 6,979,016 B1 | 12/2005 | Wegener |
| 7,201,255 B1 * | 4/2007 | Kreikemeier ............... 182/2.5 |
| 7,261,346 B1 * | 8/2007 | Kubesh ...................... 293/115 |
| 2006/0279096 A1 * | 12/2006 | Helms et al. ................ 293/115 |

* cited by examiner

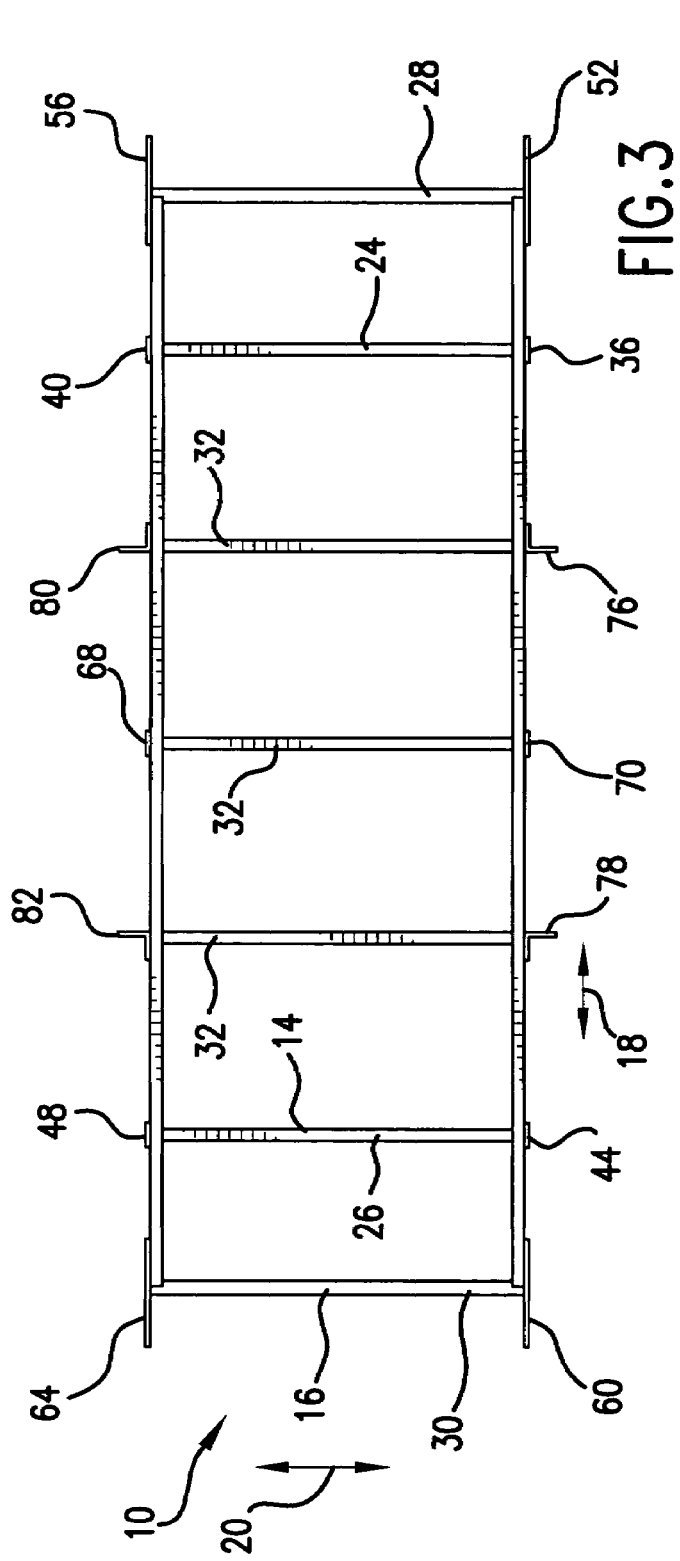
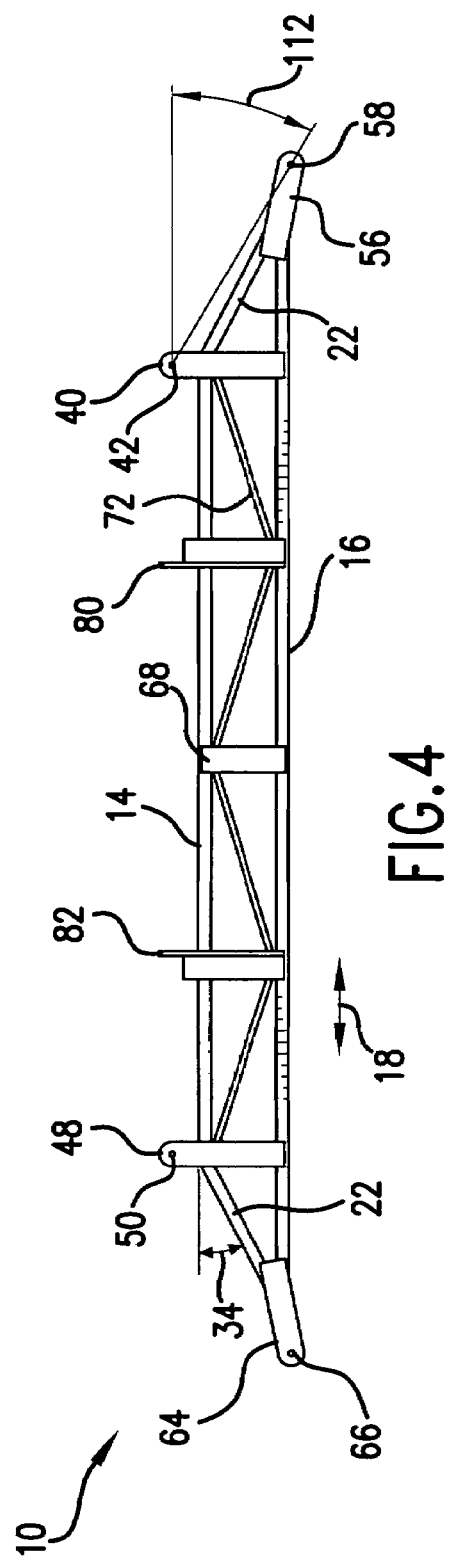

MULTIPLE USE VEHICLE ACCESSORY

FIELD OF THE INVENTION

The present invention relates generally to a vehicle accessory that can be utilized for a variety of uses. More particularly, the present application involves a multiple use vehicle accessory that can be used, for example, as a brush guard, a ramp, a lever and a ladder.

BACKGROUND

Vehicles are often driven off of conventionally paved roads for purposes of both work and recreation. Travel through and across natural terrain such as sand, gravel, riverbeds, rock, mud and foliage introduces problems and challenges not encountered by the everyday motorist. Vehicles adapted for such driving conditions are often fitted with oversized tires for necessary traction and improved ground clearance. Off road vehicles may be further equipped with a locking differential that delivers all available torque to the wheel on the axle of the vehicle that has the most traction. This arrangement reduces the likelihood of the vehicle becoming stuck in mud, ice or snow.

The front of a vehicle includes numerous expensive parts such as the radiator, headlights, water pump, battery, hood and grill. During off road or even during regular use these parts can be damaged by limbs, brush and other debris. It is therefore known to affix a brush guard to the front of the vehicle in order to protect the front of the vehicle and associated components from damage. A brush guard is generally made of a tubular framework of steel that is bolted directly onto the front bumper, hood and/or frame of the vehicle. The brush guard normally has an open front face to allow air to be drawn into the radiator of the vehicle for cooling purposes. Although smaller items such as stones and twigs can pass through the brush guard, larger more damaging objects like tree limbs are contacted by the brush guard and prevented from damaging the front of the vehicle.

It is sometimes the case that vehicles become stuck in mud or snow during off road use. In order to extract the vehicle a jack or lever may need to be employed to raise a portion of the vehicle. The user of the vehicle needs to keep such instruments handy as brush guards are not designed to be removed from the vehicle and used as a lever. Other situations exist in which the user of the vehicle is in need of a ramp or ladder to move items onto a bed of the vehicle or to access elevated areas such as the limb of a tree when hunting. Here, additional items such as ramps and ladders are stored in the vehicle for these occasions. Further, it is sometimes the case that a particular area, such as a creek, is impassible even to a vehicle equipped for off road use. In such instances a bridge must be laid down in order to allow the vehicle to traverse such an obstacle. Such a bridge must be transported by the vehicle to the location in question for use.

As such, a user of an off road vehicle must transport a multiplicity of items to accomplish expected tasks and to guard against unexpected occurrences. A user could carry a number of these items only to discover that the one item he or she failed to bring was the one that was actually most needed on a particular occasion. Such a situation is of course undesirable and even more so considering the user may be located in a remote, hard to reach area. In other instances, the users of vehicles for work and personal purposes likewise will need to keep on hand a variety of items for accomplishing multiple tasks.

SUMMARY

Various features and advantages of the invention will be set forth in part in the following description, or may be obvious from the description, or may be learned from practice of the invention.

The present invention includes, in one aspect of one exemplary embodiment, a multiple use vehicle accessory that has a first member that is longer in the longitudinal direction than in the lateral direction. A projecting mounting member is present and has an aperture, and a longitudinal mounting member is also included with an aperture. A line that extends from the center of the aperture of the projecting mounting member to the center of the aperture of the longitudinal mounting member is at an angle from 10° to 60° to the longitudinal direction. An end support is attached to an end of the first member and extends at an angle to the longitudinal direction. At least one of the projecting mounting member and the longitudinal mounting member is attached to at least one of the first member and the end support.

One aspect of the present invention provides for an exemplary embodiment of a multiple use vehicle accessory that has a first member that is longer in the longitudinal direction than in the lateral direction. A second member is present and is longer in the longitudinal direction than in the lateral direction. An end support is attached to both an end of the first member and to an end of the second member. The end support extends at an angle to the longitudinal direction. A cross member extends in the lateral direction and spans the distance between opposite sides of the second member.

Another aspect of the present invention resides in an exemplary embodiment of a multiple use vehicle accessory that has a first unit. The first unit has a first member that is longer in the longitudinal direction than in the lateral direction. The first unit also has a projecting mounting member that has an aperture. An end support is attached to an end of the first member. The end support extends at an angle to the longitudinal direction. The first unit is configured to be attached to a vehicle for use as a brush guard. Also, the first unit is configured to be capable of being traversed by a vehicle.

These and other features, aspects and advantages of the present invention will become better understood with reference to the following description and appended claims. The accompanying drawings, which are incorporated in and constitute part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended Figs. in which:

FIG. 3 is a back view of the multiple use vehicle accessory of FIG. 1.

FIG. 4 is a side view of the multiple use vehicle accessory of FIG. 1.

Figure 1:
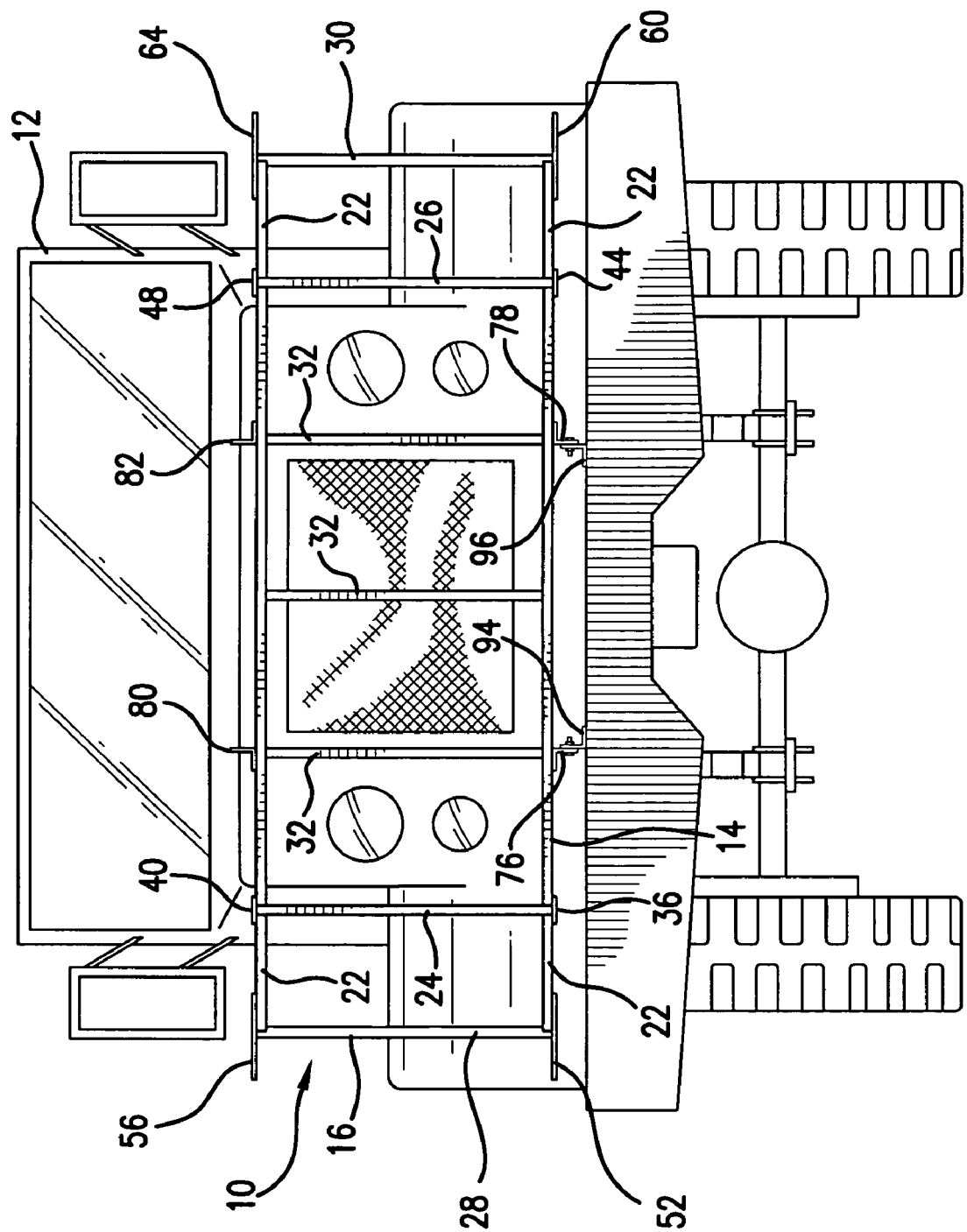
FIG. 1 is a front view of a multiple use vehicle accessory attached to a vehicle so as to be used as a brush guard in accordance with one exemplary embodiment of the present invention.

Repeat use of reference characters in the present specification and drawings is intended to represent the same or analogous features or elements of the invention.

DETAILED DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

The present invention provides for a multiple use vehicle accessory 10 that can be used for a variety of purposes associated with a vehicle 12 and with other activities affiliated with off road activities. The multiple use vehicle accessory 10 can also be utilized in other applications that do not involve off road use. The multiple use vehicle accessory 10 includes one or more units 84 that have a first rectangular member 14 and a second rectangular member 16. One or more end supports 22 are also present and are oriented so as to extend at an angle to the longitudinal direction 18 of the multiple use vehicle accessory 10. The units 84 can be attached to one another in a variety of manners to form structures that allow for various utility.

Figure 2:
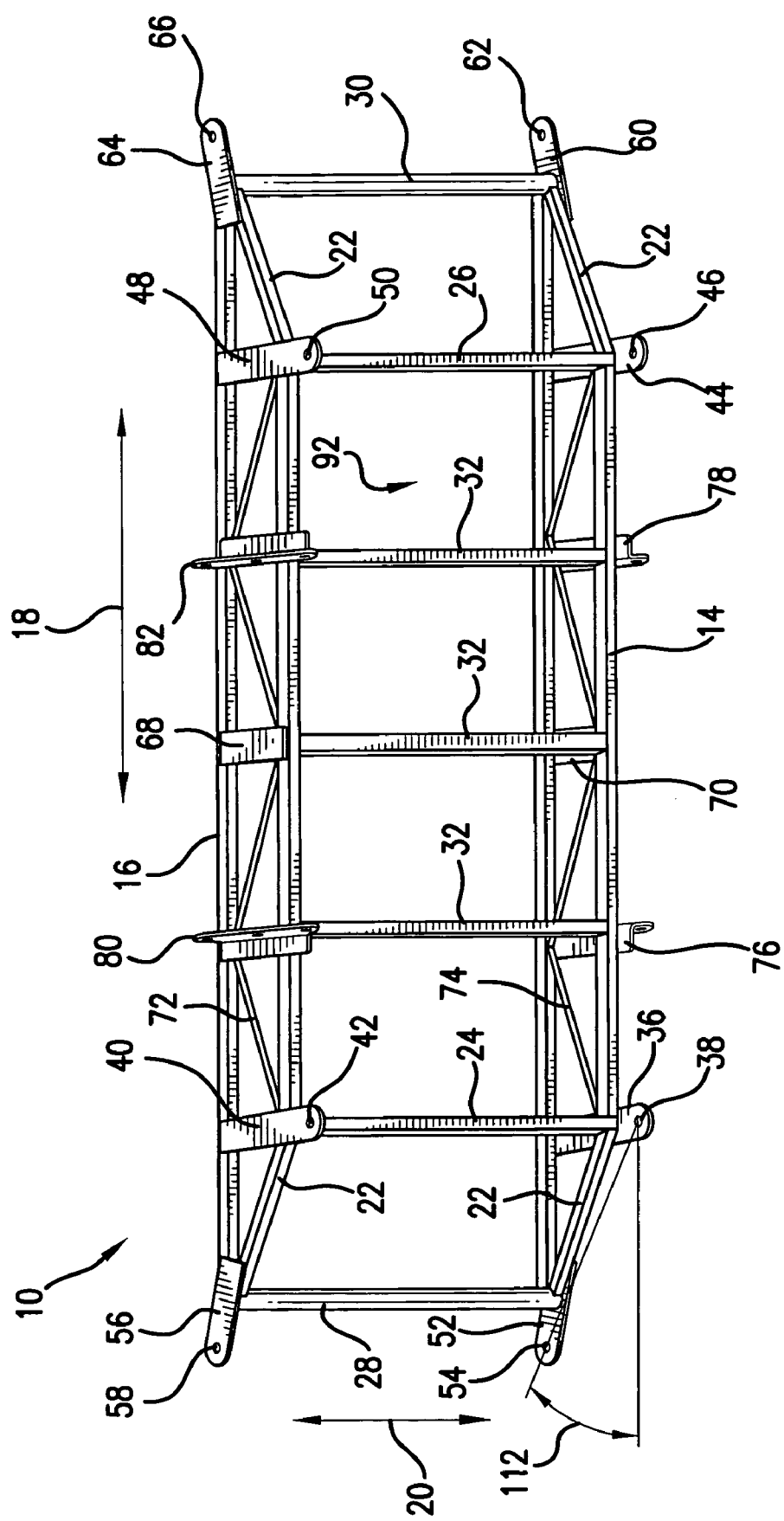
FIG. 2 is a perspective view of the multiple use vehicle accessory of FIG. 1.

The multiple use vehicle accessory 10 is shown attached to a vehicle 12 in FIG. 1 so as to be used as a brush guard. The multiple use vehicle accessory 10 prevents limbs, brush and other debris from contacting the vehicle 12 and damaging parts located at the front of the vehicle 12 such as the radiator, hood, headlights and battery. The multiple use vehicle accessory 10 is made of a material strong enough to withstand impacts normally associated with off road use of the vehicle 12. FIGS. 2 through 4 show various views of the multiple use vehicle accessory 10 when unattached to the vehicle 12.

The multiple use vehicle accessory 10 includes a first rectangular member 14 that is made of $\frac{1}{8}^{th}$ inch square 1 inch by 1 inch tubing. However, other cross-sectional shapes of the first rectangular member 14 are possible. For example, the first rectangular member 14 can have a rectangular, flat (two sided), triangular or circular shaped cross-section. Additionally, the triangular or circular shaped tubing can be employed in other embodiments. Still further, the first rectangular member 14 can have a cross-section in the shape of a channel, an angle or an I-beam. The cross-section of the first rectangular member 14 can be consistent throughout its entirety, or the cross-section can vary. For example, the ends 24 and 26 of the first rectangular member 14 can have a solid circular cross-section while the longitudinally extending portions of the first rectangular member 14 can be square shaped tubing. In the exemplary embodiment of FIGS. 1-5, the entire first rectangular member 14 is made of square shaped tubing. Although described as being made of $\frac{1}{8}^{th}$ inch square 1 inch by 1 inch tubing, the dimensions can vary in other embodiments. For instance, the thickness of the tubing may be from $\frac{1}{16}^{th}$ inch to $\frac{1}{2}$ inch. Likewise, the size of the tubing need not be 1 inch, but may be anywhere from $\frac{1}{4}$ inch to 2 inches in other embodiments. The first rectangular member 14 can be made of any suitable material. For example, steel, aluminum, fiberglass or plastic may be employed in certain exemplary embodiments.

The second rectangular member 16 can be configured in a similar manner as the first rectangular member 14. The second rectangular member 16 has longitudinally extending portions that are made of $\frac{1}{8}^{th}$ inch square 1 inch by 1 inch tubing. The ends 28 and 30 of the second rectangular member 16 have solid cross-sections that are circular in shape. It is to be understood that the cross-section of the second rectangular member 16 can be varied in other embodiments. By way of example, the cross-sections may be square, rectangular or circular in other embodiments. The cross-sectional shape, dimensions and material of the second rectangular member 16 can be selected as those described above with respect to the first rectangular member 14. The second rectangular member 16 defines an open area 92. In the exemplary embodiment shown in FIGS. 1-5, the second rectangular member 16 extends a greater length in the longitudinal direction 18 than does the first rectangular member 14.

The multiple use vehicle accessory 10 includes an end support 22 that extends from an end 24 of the first rectangular member 14 to an end 28 of the second rectangular member 16. As such, the end support 22 extends at an angle 34 to the longitudinal direction 18. The angle 34 can be from 30° to 45° in various exemplary embodiments. Further, the angle 34 can be from 15° to 70° in yet other exemplary embodiments of the present invention. In accordance with one exemplary embodiment, the angle 34 is 30° degrees. The cross-sectional shape, dimensions and material making up the end support 22 can be provided as that described above with respect to the first rectangular member 14. In the exemplary embodiment shown in FIGS. 1-5, the end support 22 is made of 1/8th inch square 1 inch by 1 inch tubing. Also in the exemplary embodiment shown in FIGS. 1-5, four end supports 22 are present. Two of the end supports 22 extend from end 24 to end 28. The other two end supports 22 extend from end 26 to end 30. The end supports 22 are connected to the corners of the first rectangular member 14 and second rectangular member 16 and act to tie these two structures together. Although described as employing four end supports 22, other exemplary embodiments exist in which any number of end supports 22 are present. For example, up to eight end supports 22 may be present in accordance with other exemplary embodiments.

A plurality of cross members 32 extend in the lateral direction 20 between the longitudinal portions of the first rectangular member 14. The cross-section, dimensions and material of the cross members 32 can be arranged like that of the first rectangular member 14 described above. Although three cross members 32 are present in the multiple use vehicle accessory 10 shown in FIGS. 1-5, any number may be employed in accordance with various exemplary embodiments. For example from zero to ten cross members 32 may be used. The cross members 32 are arranged so as to extend in a direction parallel to the ends 24 and 26 of the first rectangular member 14. In other embodiments, the cross members 32 can extend at an angle to the ends 24 and 26. The cross members 32 act to strengthen the first rectangular member 14 and also demonstrate various utility as will be described below.

A pair of mounting brackets 76 and 78 are connected to the sides of the first rectangular member 14 and the second rectangular member 16. An additional pair of mounting brackets 80 and 82 are connected to the opposite side of the first and second rectangular members 14 and 16. As shown in FIG. 1, mounting bracket 76 is attached to mounting plate 94 of vehicle 12. Additionally, mounting bracket 78 is attached to mounting plate 96 of vehicle 12. These connections may be made by disposing bolts through apertures defined in the mounting brackets 76, 78 and mounting plates 94, 96. In this manner, the multiple use vehicle accessory 10 is mounted onto the vehicle 12 and is used as a brush guard. Limbs, debris and other objects are prevented from damaging the front portion of the vehicle 12 through contact primarily with the first rectangular member 14, end supports 22 and cross members 32. Although it is to be understood that the second rectangular member 16 provides some protection to the vehicle 12. Aside from using the mounting brackets 76 and 78, the multiple use vehicle accessory 10 can be connected to the vehicle 12 in a variety of manners. For instance, mounting brackets 80 and 82 may be connected to complimentary mounting plates on the vehicle 12. Further, the vehicle 12 may have a recess that receives the multiple use vehicle accessory 10, or a pair of clamps on the vehicle 12 can be used to grasp the multiple use vehicle accessory 10 and hold it in a desired position.

The multiple use vehicle accessory 10 includes a projecting mounting member 36 that is connected to the sides of the first rectangular member 14, second rectangular member 16 and one of the end supports 22. Projecting mounting member 36 defines an aperture 38 for purposes that will be described below. A projecting mounting member 40 is present on an opposite side of the first rectangular member 14, second rectangular member 16 and end support 22. Projecting mounting member 40 defines an aperture 42. Apertures 38 and 42 can be circular holes that are co-axial in accordance with one exemplary embodiment of the present invention. The axes of the apertures 38 and 42 can extend in the lateral direction 20 and be parallel to the lateral direction 20. However, other embodiments exist in which the apertures 38 and 42 are slots or rectangular in shape.

Another pair of projecting mounting members 44 and 48 are located on end 26 of the first rectangular member 14 and define apertures 46 and 50. As described with respect to apertures 38 and 42, apertures 46 and 50 can be holes, slots or rectangular in shape. Apertures 46 and 50 may be holes that are co-axial and have axes that extend in the lateral direction 20 and may be parallel to the lateral direction 20. The projecting mounting members 36, 40, 44 and 48 have utility as will be described below and also act to function so as to tie together and strengthen the multiple use vehicle accessory 10.

A longitudinal mounting member 52 is included and extends from the end 28 of the second rectangular member 16. In this regard, the longitudinal mounting member 52 is connected to the side of the second rectangular member 16 and the end support 22. Although extending in the longitudinal direction 18, the longitudinal mounting member 52 is angled with respect to the longitudinal direction 18. The longitudinal mounting member 52 can be oriented at an angle from 10° to 30° to the longitudinal direction 18. In other embodiments, the longitudinal mounting member 52 is not angled with respect to the longitudinal direction 18. The longitudinal mounting member 52 defines an aperture 54. Aperture 54 is a hole in the exemplary embodiment shown in FIGS. 1-5. However, aperture 54 can be a slot or may be rectangular shaped in other embodiments.

Another longitudinal mounting member 56 extends from the end 28 on an opposite side of the multiple use vehicle accessory 10 from the longitudinal mounting member 52. Longitudinal mounting member 56 has an aperture 58 that is a hole but may be a slot or rectangular shaped in other embodiments. Apertures 54 and 58 are co-axial with one another and have axes that are parallel to and extend in the lateral direction 20. An additional set of longitudinal mounting members 60 and 64 extend from the opposite end 30 and can be configured in a manner similar to that previously discussed with respect to longitudinal mounting member 52. Longitudinal mounting member 60 defines an aperture 62, and longitudinal mounting member 64 defines aperture 66. Apertures 62 and 66 may be provided as previously discussed with respect to aperture 54. In the exemplary embodiment shown, apertures 62 and 66 are holes that are co-axial with one another and have axes that are parallel to and extend in the lateral direction 20.

A pair of support posts 68 and 70 extend between and connect to the first rectangular member 14 and the second rectangular member 16. The support posts 68 and 70 function so as to strengthen the longitudinally extending portions of the first and second rectangular members 14 and 16. Although shown as being rectangular and flat in shape, the support posts 68 and 70 can be variously configured in other embodiments. The multiple use vehicle accessory 10 is also strengthened by the presence of a pair of structural reinforcing members 72 and 74 that are located between the longitudinally extending portions of the first and second rectangular members 14 and 16. The structural reinforcing members 72 and 74 help prevent bowing of the first rectangular member 14 with respect to the second rectangular member 16. Although shown as having a circular cross section, the structural reinforcing members 72 and 74 can have various cross-sectional shapes. Additionally, the structural reinforcing members 72 and 74 need not traverse the entire length of the longitudinally extending portions of the first rectangular member 14 in other embodiments. The support posts 68 and 70 in addition to the structural reinforcing members 72 and 74 can be made of a variety of materials such as steel, aluminum, fiberglass or plastic.

Figure 10:
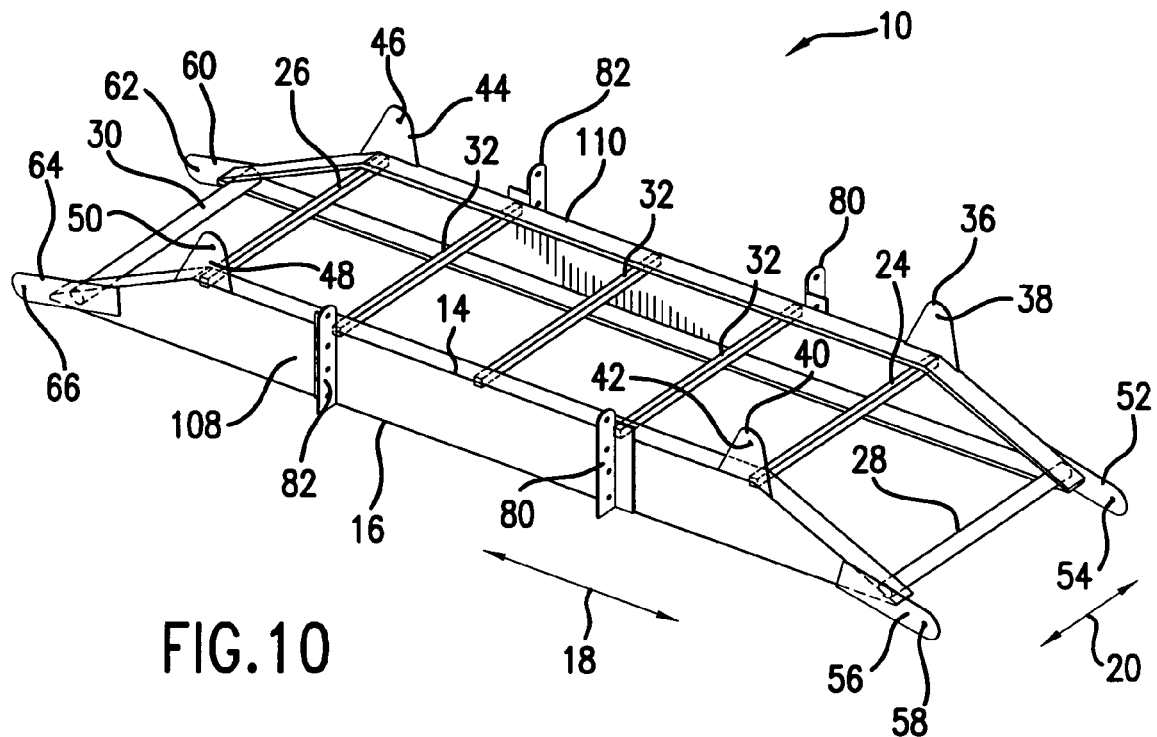
FIG. 10 is a perspective view of the multiple use vehicle accessory in accordance with an alternative exemplary embodiment of the present invention.
Figure 11:
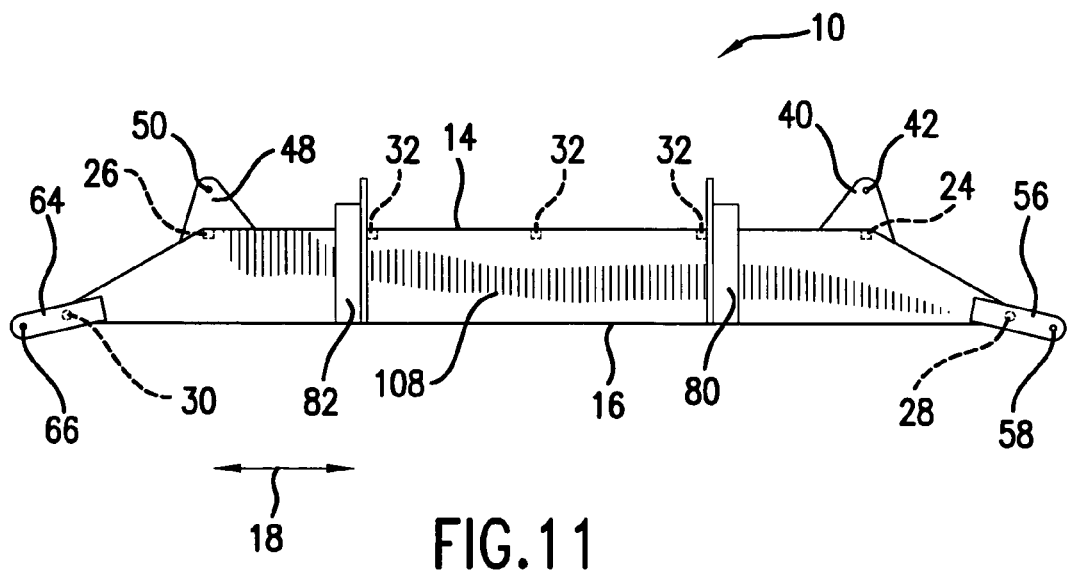
FIG. 11 is a side view of the multiple use vehicle accessory of FIG. 10.

Although shown in the exemplary embodiment of FIGS. 1-4 as having a generally framework shape, the multiple use vehicle accessory 10 can have components that are variously shaped in other embodiments. For instance, FIGS. 10 and 11 show an additional exemplary embodiment in which the multiple use vehicle accessory 10 includes a pair of plates 108 and 110 on either side thereof. The plates 108 and 110 act to form the sides of the first and second rectangular members 14 and 16. In this regard, the first rectangular member 14 can be described as being made of the ends 24 and 26 in addition to the upper portions of the plates 108 and 110. In a similar manner, the second rectangular member 16 is made of the ends 28 and 30 in addition to the lower portions of the plates 108 and 110. The plates 108 and 110 can be made of steel, or the plates 108 and 110 can be made of aluminum, fiberglass or plastic in other embodiments. The plates 108 and 110 can be solid members or may have apertures formed therein. The projecting mounting members 36, 40, 44 and 48 and the longitudinal mounting members 52, 56, 60 and 64 can be integrally formed with or attached to the plates 108 and 110. These components can also be attached to the ends 24, 26, 28 and 30 in certain embodiments. The plates 108 and 110 can be channel pieces, angle pieces or flat pieces. In certain embodiments the plates 108 and 110 are one quarter inch flat stock.

Figure 12:
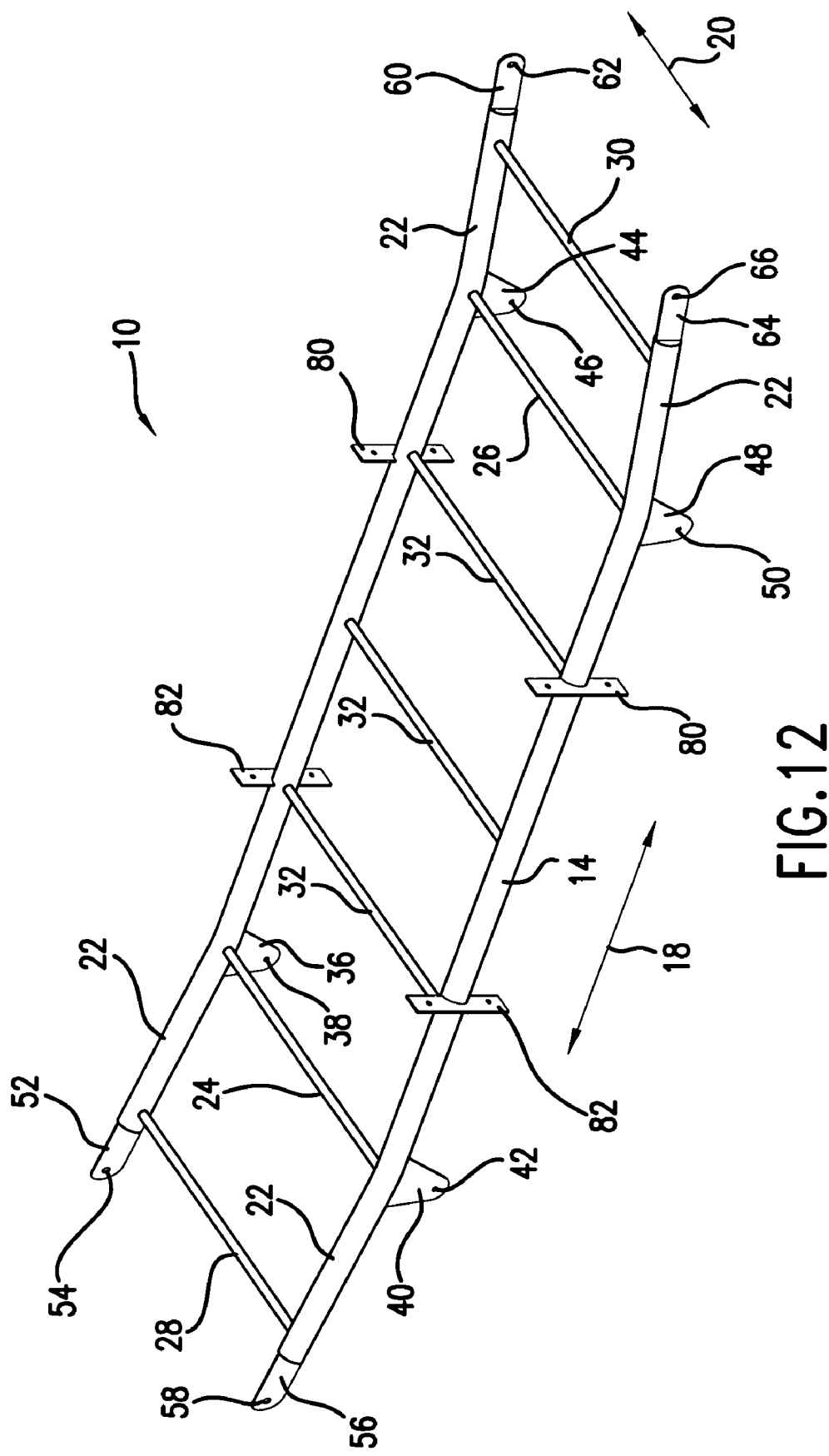
FIG. 12 is a perspective view of the multiple use vehicle accessory in accordance with another exemplary embodiment of the present invention.

FIG. 12 shows an additional exemplary embodiment of the multiple use vehicle accessory 10. In this embodiment, the second rectangular member 16 is not present, although members resembling ends 28 and 30 are present in order to help tie together and strengthen the parts of the multiple use vehicle accessory 10 including end supports 22. The longitudinal mounting members 52, 56, 60 and 64 can extend from these components. The remainder of the multiple use vehicle accessory 10 is configured substantially the same as the one described in relation to FIGS. 1-4. The orientation of apertures 38, 42, 46, 50, 54, 58, 62 and 66 can be the same for the exemplary embodiments in FIGS. 10-12 as described above with respect to the embodiment of FIGS. 1-4. Various components of the exemplary embodiment shown in FIG. 12 are made of round tubing.

The variously described components of the multiple use vehicle accessory 10 can be attached to one another in a variety of manners. For example, the ends 24 and 26 can be welded onto the laterally extending portions of the first rectangular member 14. Likewise, the end support 22 can be welded to the ends 24 and 28. In other versions of the multiple use vehicle accessory, the end support 22 can be attached to the ends 24 and 28 through the use of mechanical fasteners such as bolts. In other embodiments, components of the multiple use vehicle accessory 10 can be integrally formed with one another. In this regard, the ends 24 and 28 may be formed as a single, integral piece with end support 22. As such, the various components of the multiple use vehicle accessory 10 such as the first rectangular member 14, second rectangular member 16, end support 22, cross members 32, support post 68, mounting bracket 76, etc. may be attached through welding, mechanical fasteners or can be made as one or more integral pieces. The components of the multiple use vehicle accessory 10 can be made out of a variety of materials such as steel, fiberglass, aluminum or plastic.

The multiple use vehicle accessory 10 can be utilized in a number of different applications besides that of a brush guard. For example, the multiple use vehicle accessory 10 can be reoriented on the vehicle 12 so as to be used as a luggage rack. In this regard, the multiple use vehicle accessory 10 can be detached from the vehicle 12 and rotated essentially 90° so that the first rectangular member 14 is located beneath the second rectangular member 16. Mounting brackets 76 and 78 can be attached to mounting plates 94 and 96 in order to connect the multiple use vehicle accessory 10 to the vehicle 12. Luggage, game or other items may be placed within the multiple use vehicle accessory 10 for transport.

Additionally or alternatively, the multiple use vehicle accessory 10 can be attached to the vehicle 12 so as to be configured as a windshield guard. The multiple use vehicle accessory 10 can also be attached to the front or back bumper of the vehicle 12 and used as a tow bar or as a ball hitch adapter. An adapter can also be located into the trailer hitch receiver of the vehicle 12, and the multiple use vehicle accessory 10 can be attached to the adapter. A mounting element may be provided on the multiple use vehicle accessory 10, and a spare tire can be mounted thereon. An additional adapter can be attached to the adapter located into the trailer hitch receiver of the vehicle 12 that includes a tow ball for towing of a trailer. Alternatively, the adapter that is located into the trailer hitch receiver of the vehicle 12 can include a tow ball for towing purposes in addition to holding the multiple use vehicle accessory 10 as previously discussed.

The multiple use vehicle accessory 10 can also find utility when detached from the vehicle 12. For example, the multiple use vehicle accessory 10 can be used as a ladder. Here, one can place an end of the multiple use vehicle accessory 10 on the ground and use the ends 24 and 26 in addition to the cross members 32 as rungs of a ladder. The multiple use vehicle accessory 10 can be employed as a gurney to remove an injured individual from a remote location. Here, the ends 28 and 30 of the second rectangular member 16 can be grasped by two people in order to transport an injured individual placed in the multiple use vehicle accessory 10. Further, the multiple use vehicle accessory 10 can be used as a hand truck for the transport of boxes, game or other items. Here, a set of wheels can be attached to the projecting mounting members 36 and 40. The wheels may be on spindles that are mounted through apertures 38 and 42 of the projecting mounting members 36 and 40. Alternatively, an axle may be placed through the apertures 38 and 42 and the wheels can be attached thereon. A user can grasp end 30 of the second rectangular member 16 in order to push the hand truck. If desired, wheels need not be employed in other applications. Here, the multiple use vehicle accessory 10 can be used as a sled to pull game or other items from a remote location without the use of wheels.

Figure 5:
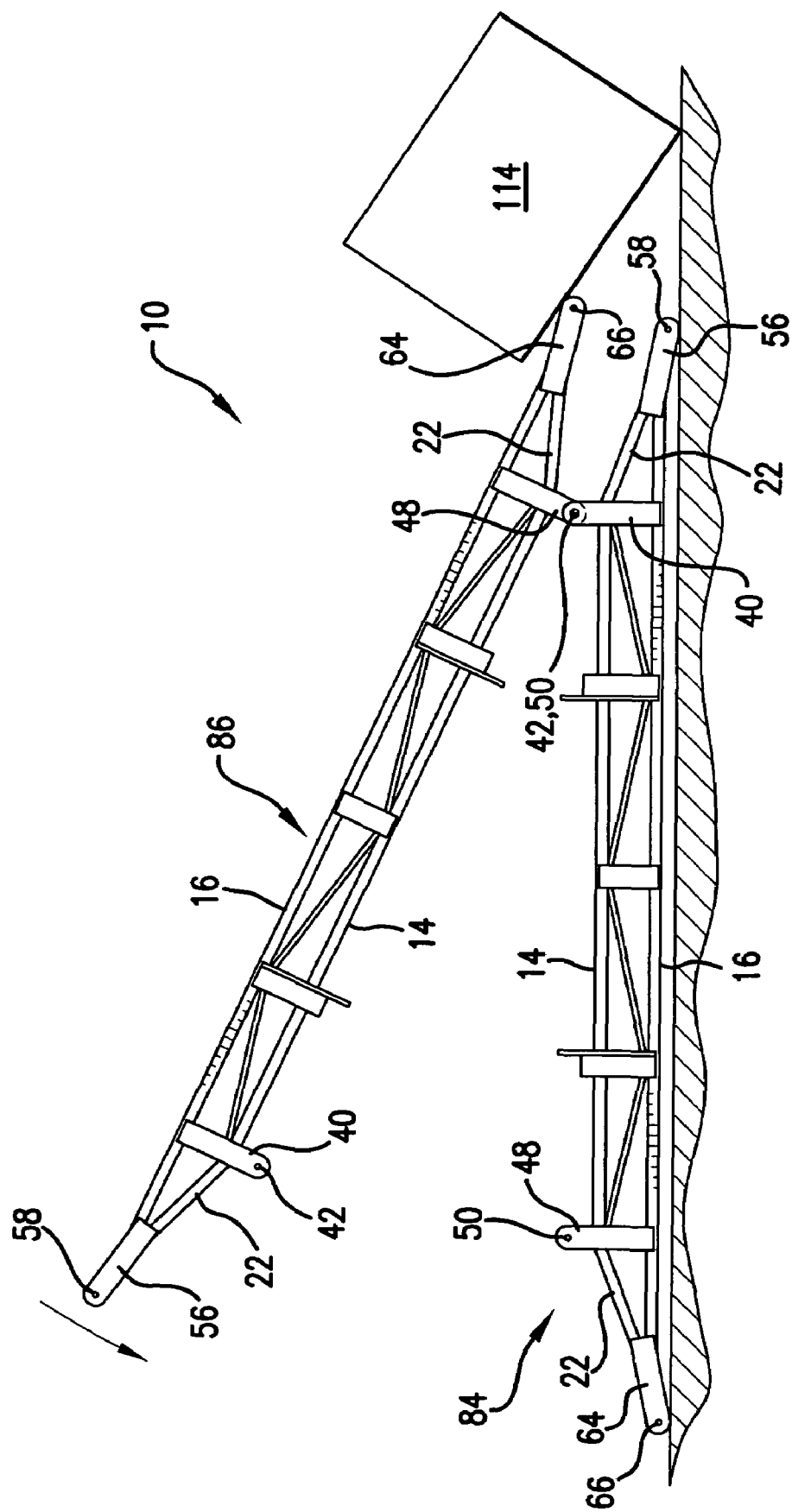
FIG. 5 is a side view of two units of the multiple use vehicle accessory attached to one another and used as a lifting lever in accordance with one exemplary embodiment of the present invention.

The multiple use vehicle accessory 10 also finds utility in applications in which more than one multiple use vehicle accessory 10 is employed. FIG. 5 shows one such embodiment in which a first unit 84 and a second unit 86 are configured as a lever. The units 84 and 86 can be similar to one another or may be different. In this regard, differences between the units 84 and 86 may include but not be limited to the number of cross members 32, angle of extension of the end supports 22 to the longitudinal direction 18, or the presence or absence of support posts 68 and 70 and structural reinforcing members 72 and 74. Likewise, the units 84 and 86 can be configured so as to be substantially identical to one another. However, it may be advantageous for the spacing of certain components to be different between the first unit 84 and the second unit 86. In this regard, the location of the mounting brackets 76, 78, 80 and 82 with respect to the first and second rectangular members 14 and 16 can be varied between the first unit 84 and the second unit 86 so as to be offset. This offsetting will allow a set of mounting brackets 76, 78, 80 and 82 of the first and second units 84 and 86 to nest onto one another so that the first and second units 84 and 86 can be connected to one another in a side by side arrangement. Additional components such as the projecting mounting members 36, 40, 44 and 48 in addition to the longitudinal mounting members 52, 56, 60 and 64 can be offset between the first and second units 84 and 86 so that these components can be connected to one another to allow for connection between the units 84 and 86.

As shown in FIG. 5, the projecting mounting members 36 and 40 of the first unit 84 are connected to the projecting mounting members 44 and 48 of the second unit 86. This connection can be effected with one or more pins, but the use of bolts or an axle placed through the apertures 38, 42, 46 and 50 are also possible. The first unit 84 faces in a direction opposite to the second unit 86, and the two units 84 and 86 pivot with respect to one another so as to form a lifting lever for lifting an object 114. The lifting lever can be used to lift a vehicle 12 that is stuck in mud or on rocks. A variety of other uses for the lifting lever are possible. For example, the vehicle 12 can be raised with the lifting lever in order to change a flat tire. Further, the lifting lever can be used to pry open a portion of the vehicle 12 in the event of an accident in order to extract an individual therefrom. The lifting lever can also be used in other non-vehicle applications. Upon lifting the object 114 or vehicle 12, the lever can be locked in place by placing a bolt, pin or other object through aligned apertures 42 and 50 and/or aligned apertures 38 and 46. For example, when changing a flat tire the vehicle 12 can be lifted and the lever can be locked into place by the user for removing and replacing a tire to the wheel of the vehicle 12.

Figure 6:
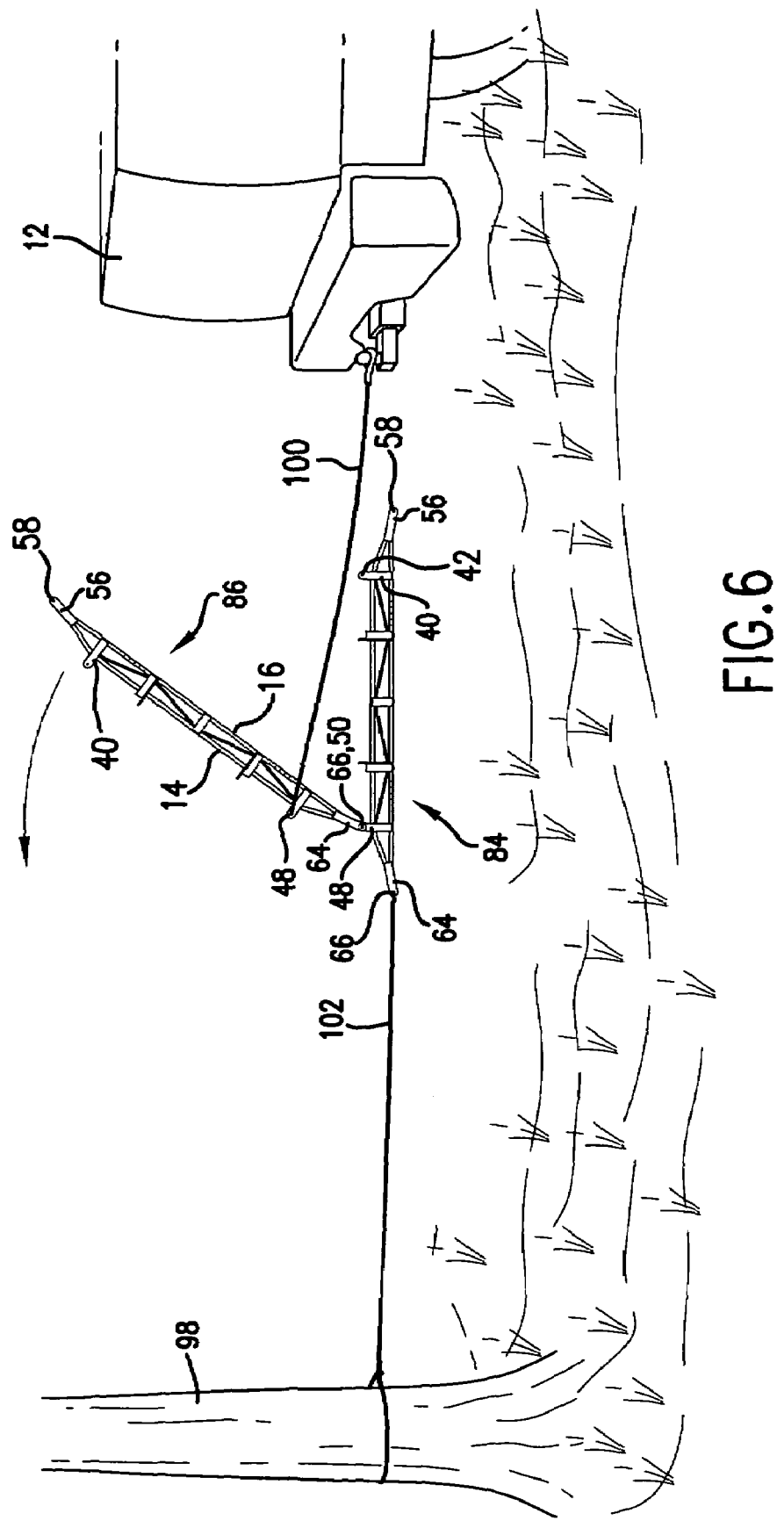
FIG. 6 is a side view of two units of the multiple use vehicle accessory attached to one another and used as a pulling lever in accordance with one exemplary embodiment of the present invention.

Another configuration of the first and second units 84 and 86 is shown in FIG. 6. Here, the units 84 and 86 are arranged as a pulling lever. The projecting mounting members 44 and 48 of the first unit 84 are pivotably connected to the longitudinal mounting members 60 and 64 of the second unit 86. The first unit 84 can be anchored to a tree 98 or other object. In this regard, an anchor line 102 is connected to the tree 98 and to the longitudinal mounting members 60 and 64 of the first unit 84. A hook line 100 is connected to the projecting mounting members 44 and 48. The hook line 100 is connected on an opposite end to a vehicle 12. The user can rotate the second unit 86 with respect to the first unit 84 in order to pull the vehicle 12 with the hook line 100. Such a utilization of the multiple use vehicle accessory 10 can be employed when the vehicle 12 becomes stuck in mud, snow or on rocks. A pin, bolt or other device can be disposed through one or more of the apertures or other portion of the first unit 84 and second unit 86 to lock their relative position with respect to one another during a pulling procedure. For example, a pin may be placed through aligned apertures 50 and 66 and/or aligned apertures 46 and 62 if the second unit 86 is rotated to such an extent so as to be in series with the first unit 84 in order to lock the relative position of units 84 and 86.

The first and second units 84 and 86 can also be utilized in other applications related to the vehicle 12. For example, the first and second units 84 and 86 can be positioned side by side to one another so that the first rectangular members 14 are located above the second rectangular members 16. The vehicle 12 can then be driven onto the first and second units 84 and 86. The units 84 and 86 can serve as ramps to allow one to access the underside of the vehicle 12 to change oil of the vehicle 12 or to perform other tasks of maintenance or repair. Further, the units 84 and 86 can function as a bridge to allow the vehicle 12 to traverse a ditch, stream or other feature.

Figure 7:
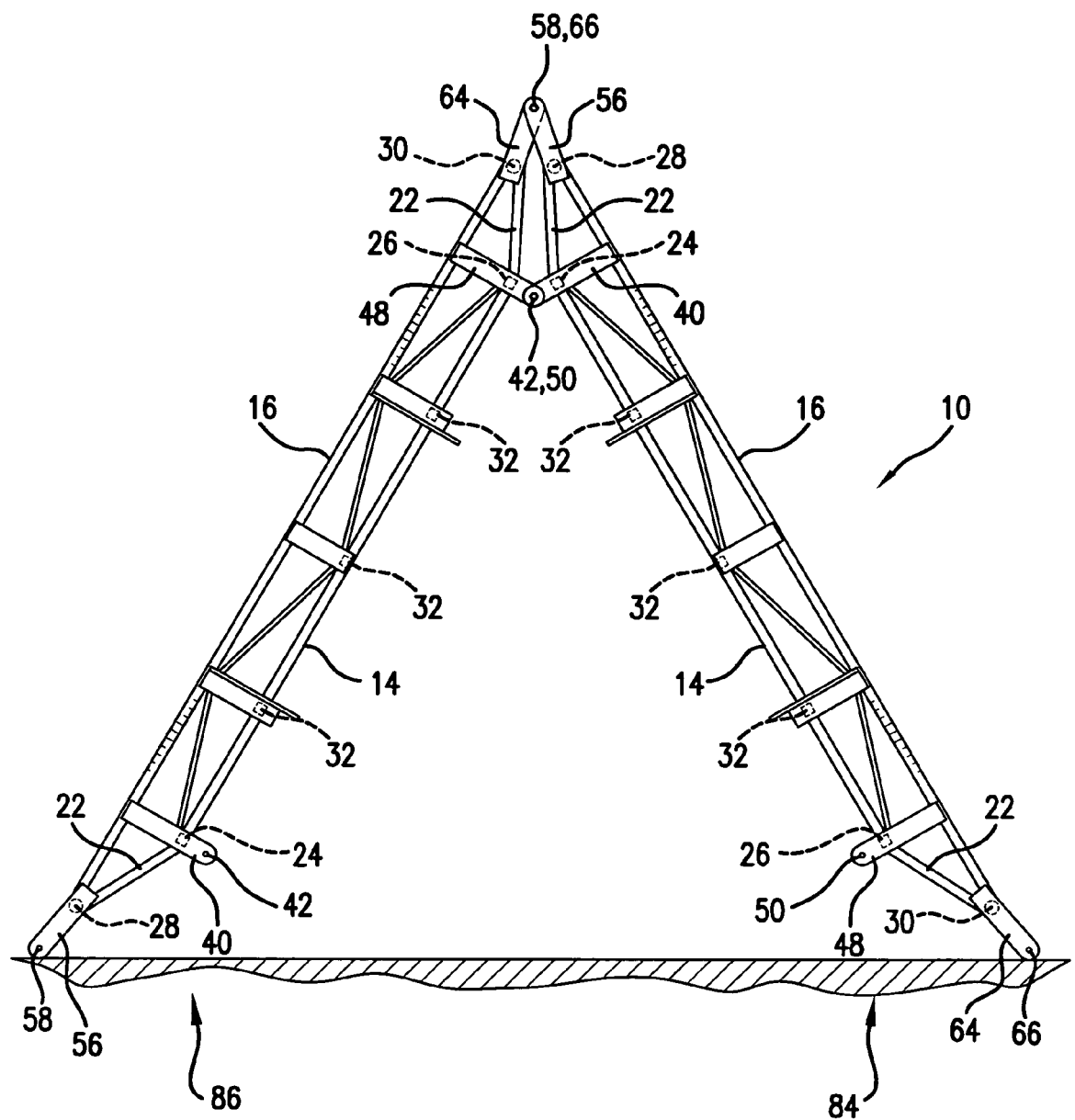
FIG. 7 is a side view of two units of the multiple use vehicle accessory attached to one another and used as a ladder in accordance with one exemplary embodiment of the present invention.

Although described as being used for purposes in connection with a vehicle 12, the first and second units 84 and 86 can be configured with respect to one another to find utility in other applications. FIG. 7 shows one such embodiment in which the units 84 and 86 are utilized as a ladder. Here, the projecting mounting members 44 and 48 and the longitudinal mounting members 60 and 64 of the first unit 84 are connected to the projecting mounting members 36 and 40 and the longitudinal mounting members 52 and 56 of the second unit 86. These connections are made with bolts, pins or other fasteners so that the connection is non-pivotable. An individual can use the cross members 32 and ends 24 and 26 as the rungs of a ladder in order to access an elevated location. In other embodiments, additional units of the multiple use vehicle accessory 10 can be connected to the bottoms of the first and second units 84 and 86 so as to extend the length of the ladder.

A line extending from aperture 38 of projecting mounting member 36 to aperture 54 of longitudinal mounting member 52 extends at an angle 112 that is 30° to a line extending parallel to the top of the longitudinally extending portion of the first rectangular member 14. The other apertures 42, 46, 50, 58 and 66 can be arranged in a similar manner so that they are also oriented at an angle of 30° to the longitudinal direction 18. In this manner, a third unit 88 could be attached to the first and second units 84 and 86 in FIG. 7 so that a triangle having 60° angles is formed. In other embodiments, the apertures 38, 42, 46, 50, 54, 58 and 66 can be oriented at various angles besides 30°. For example, the angular orientation of apertures 38, 42, 46, 50, 54, 58 and 66 can be from 20° to 70° in certain exemplary embodiments. Should the angular oritentation be at 45°, four units can be arranged so as to form a square shaped structure. The 30° angle is also advantageous in that the units can be arranged in a triangular configuration for forming various structures as will be discussed. Further, the units can be arranged so that the angular orientation of apertures 38, 42, 46, 50, 54, 58 and 66 are different between different units.

Figure 8:
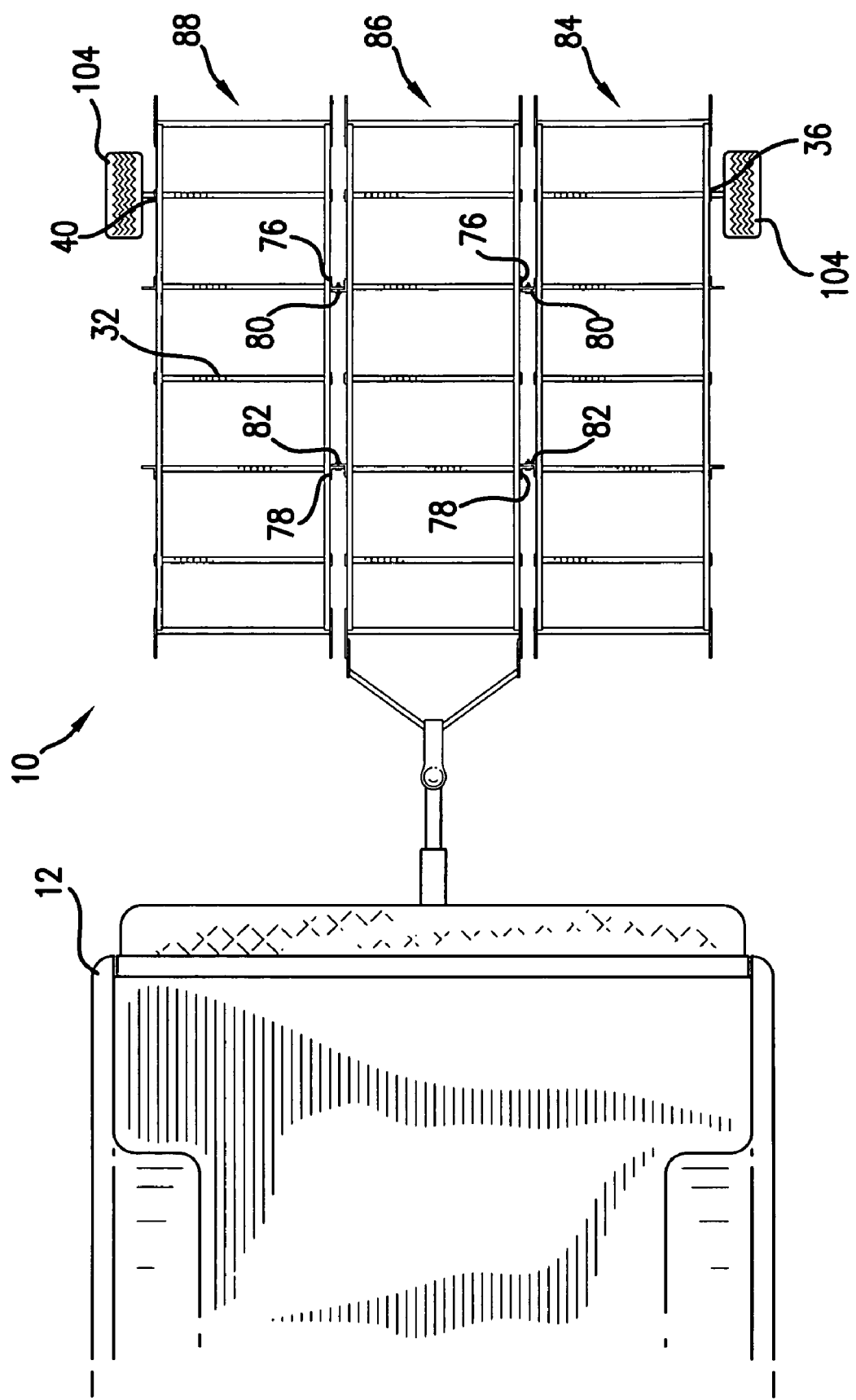
FIG. 8 is a top view of three units of the multiple use vehicle accessory attached to one another and used as a trailer in accordance with one exemplary embodiment of the present invention.

Other embodiments of the multiple use vehicle accessory 10 exist in which a third unit 88 is incorporated. FIG. 8 shows an embodiment in which three units 84, 86 and 88 are configured into a trailer. Here, the second unit 86 is located between the first unit 84 and the third unit 88. The mounting brackets 76, 78, 80 and 82 of the second unit 86 are non-pivotably connected to the mounting brackets 76 and 78 of the first unit 84 and to the mounting brackets 80 and 82 of the third unit 88. Wheels 104 are connected to the projecting mounting member 36 of the first unit 84 and to the projecting mounting member 40 of the third unit 88 and rotate thereon. The wheels 104 can be attached to spindles or to an axle that is disposed from the aperture 38 of the projecting mounting member 36 of the first unit 84 to the aperture 42 of the projecting mounting member 40 of the second unit 88. The trailer can be attached to the vehicle 12 for use in transporting objects located therein.

Figure 9:
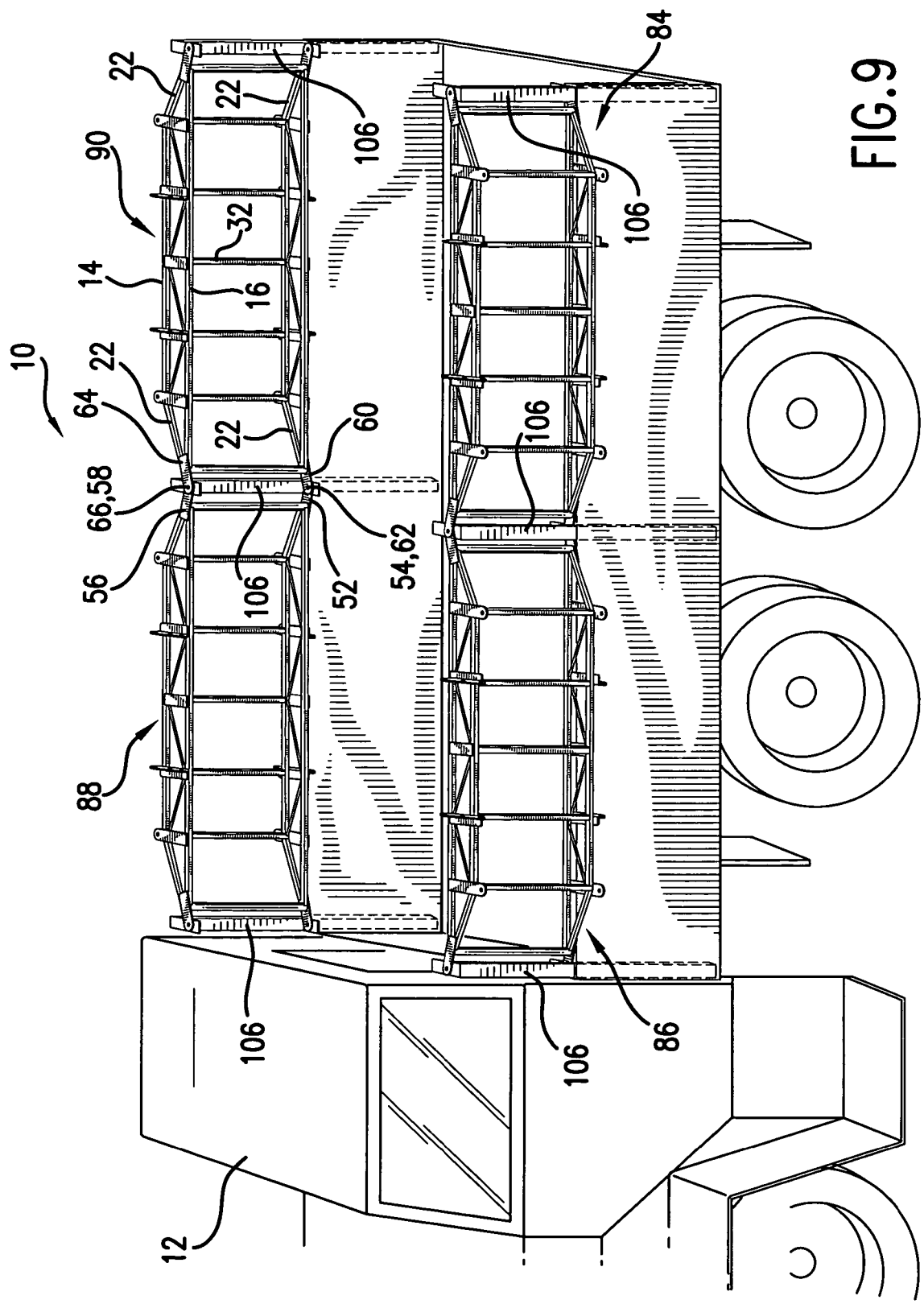
FIG. 9 is a perspective view of four units of the multiple use vehicle accessory used as bedsides of the vehicle in accordance with one exemplary embodiment of the present invention.

Three units 84, 86 and 88 of the multiple use vehicle accessory 10 can be arranged in a number of different manners to achieve various utility. For example, the units 84, 86 and 88 can be rigidly connected to one another in series so as to form a boom. Here, the projecting mounting members 36, 40, 44 and 48 in addition to the longitudinal mounting members 52, 56, 60 and 64 can be connected to one another. The boom may find utility in flipping a vehicle 12 that has become turned over on its side. The units 84, 86 and 88 can also be arranged as a deer stand. In this embodiment, the units 84, 86 and 88 can be attached to one another or may be attached to the tree as needed. Alternatively, the units 84, 86 and 88 may be arranged with one another so as to form a firewood stand. Here, the second unit 86 can be placed flat on the ground while the first unit 84 and the third unit 88 are connected to opposite ends of the second unit 86 and extend vertically. The three units 84, 86 and 88 can also be connected in a side by side arrangement for use in forming a raft. In another embodiment, the three units 84, 86 and 88 can be configured into an engine hoist. Here, the first and second units 84 and 86 can be rigidly connected and arranged in a substantially vertical manner. The third unit 88 can be pivotably connected to the top of the second unit 86 and a hook line can extend therefrom in order to be attached to the engine of the vehicle 12. The third unit 88 can be pivoted by the user with respect to the first and second units 84 and 86 in order to lift the engine. A rope or an additional unit may be used and may be connected to the first two units in order to increase the structural integrity of the engine hoist A fourth unit 90 may also be incorporated into the multiple use vehicle accessory 10 to achieve even greater utility. As shown in FIG. 9, the three units 84, 86, 88 and 90 are configured as bedsides of the vehicle 12. The units 84, 86, 88 and 90 can be attached to standards 106 of the vehicle 12 in a variety of manners. The units 84, 86, 88 and 90 find utility as bedsides of the vehicle 12 and can also be detached to be used in the variety of manners previously discussed. The units of the multiple use vehicle accessory 10 can be transported in the bed of the vehicle 12 or may be transported by being attached to the vehicle 12 as brush guards, windshield guards, spare tire holders, or as a front or rear luggage racks. One or more units may also be attached to the roof of the vehicle 12 and used as a roof top luggage rack. Other devices can be constructed with a plurality of units. For example, the units can be placed, either attached or unattached to one another, on top of an opening in the ground for use as a fox hole cover.

Multiple units can also be arranged with respect to one another to form a bridge. Here, one or more of the units can be arranged as the truss of the bridge while other units act as a ramp for the vehicle 12 and for the driving surface of the vehicle 12 over the bridge. Although a bridge can have one or more truss elements, other embodiments are possible in which multiple units are arranged to form a bridge that does not include a truss. Multiple units may be configured in series to produce a swamp bridge for traversing swampy or sandy terrain. Intermittent units can also be arranged at 90° angles to the units arranged in series to reinforce the structural integrity of the resulting swamp bridge or in response to a necessary point of placement.

Multiple units can also be arranged as a sandbag fort or as a hinged road block or gate. In other embodiments, the units can be configured into a box like structure. Items can be placed into the box and the box may be used as a parachute box for dropping supplies into a remote area.

Further, units can be arranged with respect to one another to form an A-frame or to form a tent. In this regard, first and second units 84 and 86 can be rigidly connected to one another and arranged in a vertical manner while third and fourth units 88 and 90 are offset but also rigidly connected and arranged in a vertical manner. A pole or other member can be disposed between the two sets of units and can be located at the top of the units. A canvas can be draped over the pole for use in forming the tent. Should a larger tent be desired, additional units can be rigidly connected to the bottom of the two sets of units. The two sets of units can then be moved farther apart and a larger pole and canvas can be employed to achieve a tent that is greater in size. The units can also be arranged in other embodiments so as to form scaffolding. As such, the multiple use vehicle accessory 10 can be arranged in a variety of manners to achieve items of various utility. It is to be understood that the previously described arrangements and items are only exemplary embodiments of the various uses of the multiple use vehicle accessory 10 and that other arrangements and items are possible in other embodiments.

Figure 13:
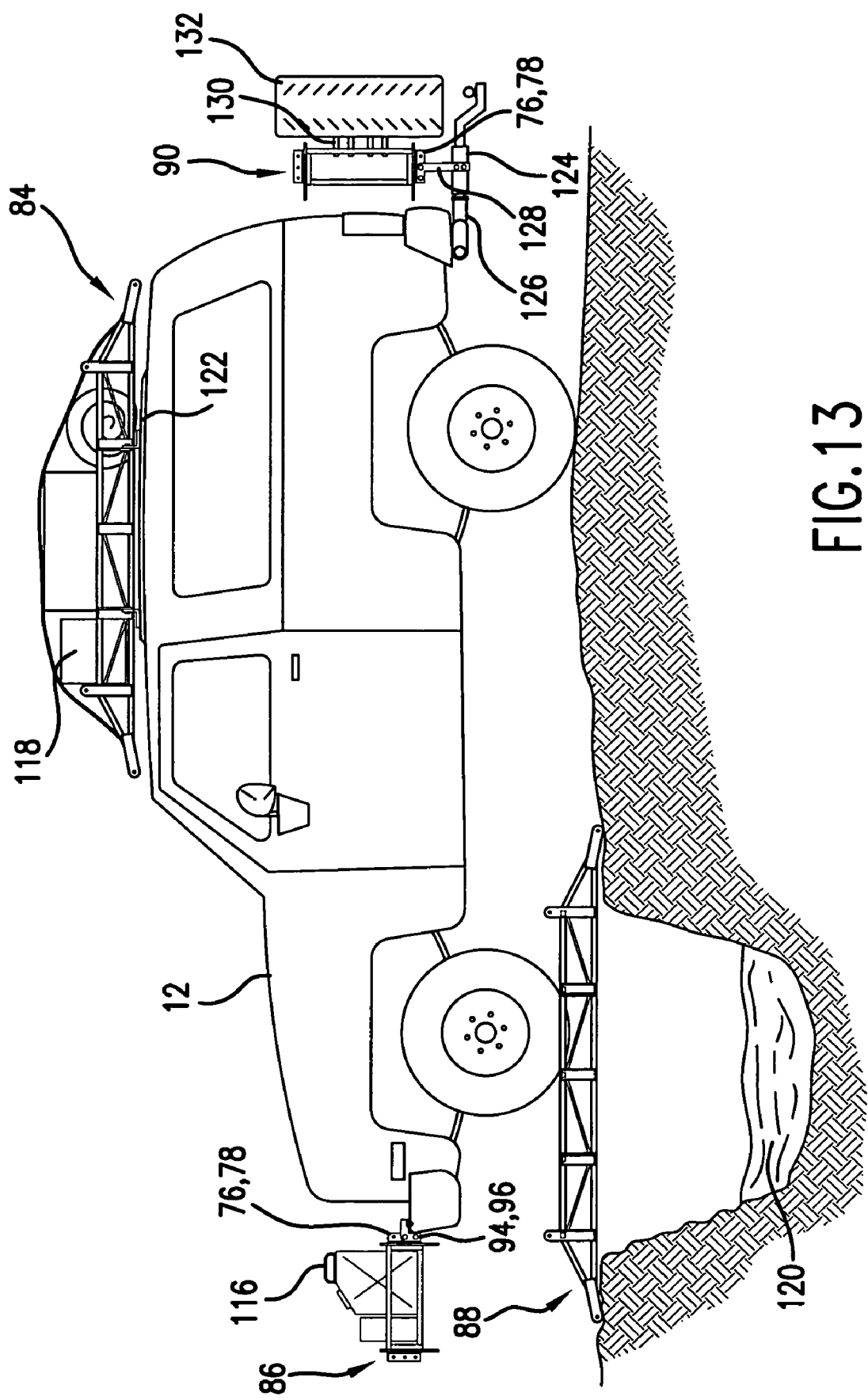
FIG. 13 is a side view of a sport utility vehicle implementing multiple use vehicle accessories in accordance with another exemplary embodiment of the present invention.

FIG. 13 shows one exemplary embodiment of the present invention in which the multiple use vehicle accessory 10 is used in conjunction with a vehicle 12 that is a sports utility vehicle. It is to be understood, however, that the multiple use vehicle accessory 10 can be used with vehicles 12 other than a sports utility vehicle in accordance with various exemplary embodiments of the present invention. A first unit 84 is attached to the roof of the vehicle 12 through the use of mounting brackets 76, 78, 80 and 82 that engage a roof rack 122 of the vehicle 12. Camping equipment 118 can be placed inside of the first unit 84 and secured thereon with the use of rope and/or a canvas tarp. Although a single unit 84 can be placed onto the roof of the vehicle 12 for transportation purposes, additional units may also be placed onto the roof to allow for additional storage.

A second unit 86 is located at the front of the vehicle 12 and is likewise attached thereto through the use of mounting brackets 76 and 78. Attachment of this sort has been shown in relation to FIG. 1 as described above with the exception that the second unit 86 is oriented at 90° to that of FIG. 1. The second unit 86 provides additional storage capability for fuel 116 or other items to be transported by the sport utility vehicle 12. A pair of third units 88 are placed so as to span a creek 120. The third units 88 can be transported inside of the sport utility vehicle 12 or may be attached to the exterior of the vehicle 12 as desired. In one exemplary embodiment, the multiple use vehicle accessory 10 can be attached to the roof of the vehicle 12 and used as a roof rack until use as a bridge is needed. At such time, the multiple use vehicle accessory 10 can be removed from the roof and positioned across a creek 120 or other obstacle. The vehicle 12 can be driven over the pair of third units 88 so that the left side tires traverse one of the units 88 and the right side tires traverse the other unit 88.

FIG. 13 also shows a fourth unit 90 used with the vehicle 12. Here, a tow hitch attachment 124 is attached to a hitch 126 of the sport utility vehicle 12. The tow hitch attachment 124 has a bracket 128 that extends in the vertical direction and is spaced from the rear of the vehicle 12. The fourth unit 90 is mounted onto the bracket 128 through the use of mounting brackets 76 and 78. A plurality of tire studs 130 are mounted to portions of the fourth unit 90. The tire studs 130 may be mounted, for instance, to the cross members 32 of the fourth unit 90. A spare tire 132 is attached to the tire studs 130 in turn so that the forth unit 90 acts to retain the spare tire 132 to the sport utility vehicle 12.

The vehicle 12 that makes use of the multiple use vehicle accessory 10 can be any type of vehicle in accordance with various exemplary embodiments. For example, the vehicle 12 can be a car, truck, sport utility vehicle, boat, all terrain vehicle (ATV), or motorcycle in accordance with certain embodiments.

The units 84 and 86 of the present invention can be arranged with respect to one another in a number of ways in order to form devices that have various utility. The units 84 and 86 can be connected in series so that apertures 66 and 62 of one unit are aligned with apertures 38 and 42 of another in addition to having apertures 54 and 58 of one unit aligned with apertures 46 and 50 of another. A further configuration of the units 84 and 86 involves having the apertures 62 and 66 of one unit aligned with apertures 54 and 58 of another so that the second rectangular members 16 of the units 84 and 86 are in series with one another.

A further arrangement of the units 84 and 86 involves a connection between the units 84 and 86 as shown in the top of FIG. 7 in which the units 84 and 86 are connected so as to be angled with respect to one another. An additional arrangement of the units exits in which apertures 62 and 66 of one unit 84 are connected to apertures 62 and 66 of another unit 86. Also, apertures 54 and 58 of unit 84 are connected to apertures 54 and 58 of unit 86 so that the units 84 and 86 are stacked on top of one another and their second rectangular members 16 touch. The units 84 and 86 can also be arranged so that they are flipped in that the first rectangular members 14 touch. Here, apertures 46 and 50 of one unit 84 connect apertures 46 and 50 of unit 86, and apertures 38 and 42 of unit 84 connect to apertures 38 and 42 of unit 86.

A further arrangement exists in which apertures 62 and 66, or apertures 54 and 58, of one unit 84 connect to apertures of mounting brackets 80 and 82, or 76 and 78, of another unit 86. In this arrangement, the units 84 and 86 extend at right angles to one another. An additional embodiment exists in which the mounting brackets 76, 78, 80 and 82 themselves connect to one another. Such an embodiment is shown in FIG. 8. Although described as being connected to apertures in the previously described arrangements, it is to be understood that the units 84 and 86 can be connected via clamps, bolts or other mechanical fasteners so that the projecting mounting members, longitudinal mounting members, mounting brackets, cross members, first rectangular members or second rectangular members are connected.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed:

1. A multiple use vehicle accessory for use with a vehicle having a tire, comprising:
    a first unit, comprising:
    a first member that is longer in the longitudinal direction than in the lateral direction;
    a second member that is longer in the longitudinal direction than in the lateral direction;
    a first projecting mounting member having an aperture, wherein said first member and said first projecting mounting member are arranged with respect to one another such that the relative position between said aperture and said first member remains fixed;
    a second projecting mounting member having an aperture, wherein said aperture of said first projecting mounting member and said aperture of said second projecting mounting member are aligned with one another and are spaced from one another a greater distance than the width of the tire;
    a third projecting mounting member having an aperture;
    a fourth projecting mounting member having an aperture, wherein said aperture of said third projecting mounting member and said aperture of said fourth projecting mounting member are aligned with one another; and
    an end support attached to said first member, wherein said end support extends at an angle to the longitudinal direction;
    wherein said first unit is configured to be attached to a vehicle for use as a brush guard, and wherein said first unit is configured to be capable of being driven over by the vehicle, and wherein said apertures of said first projecting mounting member, said second projecting mounting member, said third projecting mounting member, and said fourth projecting mounting member are located forward of said first member and said second member when said first unit is attached to the vehicle for use as a brush guard; and
    wherein said aperture of said first projecting mounting member extends completely through said first projecting mounting member in the vertical direction when said first unit is attached to the vehicle for use as a brush guard;
    wherein said aperture of said second projecting mounting member extends completely through said second projecting mounting member in the vertical direction when said first unit is attached to the vehicle for use as a brush guard;
    wherein said aperture of said third projecting mounting member extends completely through said third projecting mounting member in the vertical direction when said first unit is attached to the vehicle for use as a brush guard;
    wherein said aperture of said fourth projecting mounting member extends completely through said fourth projecting mounting member in the vertical direction when said first unit is attached to the vehicle for use as a brush guard.

2. The multiple use vehicle accessory as in claim 1, wherein said first unit is configured to be attached to a vehicle for use as a luggage rack and a windshield guard, and wherein said first unit is configured to be used as a ladder, and wherein said first unit is configured to be used with a set of wheels as a hand truck, and wherein said first unit is configured for attachment to the vehicle and for receipt of a spare tire of the vehicle, and wherein said first unit is configured to be used as a gurney.

3. The multiple use vehicle accessory as in claim 1, further comprising:
    a second unit, comprising:
    a first member that is longer in the longitudinal direction than in the lateral direction; and
    a projecting mounting member having an aperture;
    an end support attached to an end of said first member, wherein said end support extends at an angle to the longitudinal direction;
    wherein said first unit and said second unit are capable of supporting the weight of the vehicle and are configured for use as a bridge and a ramp for the vehicle.

4. The multiple use vehicle accessory as in claim 3, wherein said first and said second units are attachable to one another for use as a ladder, and wherein said first and said second units are pivotably attachable to one another for use as a pulling lever, and wherein said first and said second units are pivotably attachable to one another for use as a lifting lever.

5. The multiple use vehicle accessory as in claim 3, further comprising:
    a third unit, comprising:
    a first member that is longer in the longitudinal direction than in the lateral direction; and
    a projecting mounting member having an aperture;
    an end support attached to an end of said first member, wherein said end support extends at an angle to the longitudinal direction;
    wherein said first, said second and said third units are configured for attachment to one another and are configured for use as a tree stand, and wherein said first, said second and said third units are configured for use as a boom, and wherein said first, said second and said third units are configured for use with a set of wheels as a trailer to be pulled by the vehicle, and wherein said first, said second and said third units are configured for use with floatable elements as a raft, and wherein said first, said second and said third units are configured for use as an engine hoist, and wherein said first, said second and said third units are configured for use as a firewood stand.

6. The multiple use vehicle accessory as in claim 1, further comprising:
   a plurality of additional units each comprising:
   a first member that is longer in the longitudinal direction than in the lateral direction; and
   a projecting mounting member having an aperture;
   an end support attached to an end of said first member, wherein said end support extends at an angle to the longitudinal direction;
   wherein said units are configured for use as a ladder, and wherein said units are configured for use as a bridge, and wherein said units are configured for use as bedsides of the vehicle, and wherein said units are configured for use as an A-frame, and wherein said units are configured for use with canvas as a tent, and wherein said units are configured for use as a fox hole cover, and wherein said units are configured for use as scaffolding.

7. The multiple use vehicle accessory as in claim 1, further comprising a plurality of cross members extending in the lateral direction and attached to opposite sides of said first member;
   wherein said first member lies in a first plane, and wherein said second member lies in a second plane, wherein the first plane and the second plane are parallel to and offset from one another, and wherein the first plane and the second plane are vertically oriented when said first unit is attached to the vehicle for use as a brush guard.

8. The multiple use vehicle accessory as in claim 1, wherein said first member has a pair of ends that extend in the lateral direction such that said first member is rectangular in shape, and wherein said second member has a pair of ends that extend in the lateral direction such that said second member is rectangular in shape, wherein four of said end supports are present, and wherein each of said end supports is connected to a corner of said first member and to a corner of said second member, and wherein all four of said end supports extend at an angle to the longitudinal direction.

9. The multiple use vehicle accessory as in claim 8, wherein said four end supports extend from said second member to said first member at an angle from 20° to 45° to the longitudinal direction.

* * * * *